US011839979B2

(12) United States Patent
Rosenlund et al.

(10) Patent No.: US 11,839,979 B2
(45) Date of Patent: Dec. 12, 2023

(54) DUAL MODE FREE-DRIVE OF ROBOT ARM

(71) Applicant: Universal Robots A/S, Odense S. (DK)

(72) Inventors: Oluf Skov Rosenlund, Odense S. (DK); Andreas Rune Fugl, Odense S. (DK); Anders Skovgaard Knudsen, Odense S. (DK)

(73) Assignee: Universal Robots A/S, Odense S (DK)

( * ) Notice: Subject to any disclaimer, the term of this patent is extended or adjusted under 35 U.S.C. 154(b) by 94 days.

(21) Appl. No.: 17/251,993

(22) PCT Filed: Jun. 17, 2019

(86) PCT No.: PCT/EP2019/065857
§ 371 (c)(1),
(2) Date: Dec. 14, 2020

(87) PCT Pub. No.: WO2019/238975
PCT Pub. Date: Dec. 19, 2019

(65) Prior Publication Data
US 2021/0260757 A1 Aug. 26, 2021

(30) Foreign Application Priority Data
Jun. 15, 2018 (EP) .................................... 18178059

(51) Int. Cl.
*B25J 9/16* (2006.01)
*B25J 9/12* (2006.01)
(Continued)

(52) U.S. Cl.
CPC ............. *B25J 9/1633* (2013.01); *B25J 9/126* (2013.01); *B25J 9/163* (2013.01); *B25J 9/1638* (2013.01);
(Continued)

(58) Field of Classification Search
CPC . B25J 9/1633; B25J 9/126; B25J 9/163; B25J 9/1638; B25J 13/085; B25J 13/088;
(Continued)

(56) References Cited

U.S. PATENT DOCUMENTS 4,763,531 A    8/1988   Dietrich et al.
6,212,443 B1 *   4/2001   Nagata ................. G05B 19/423
                                                  700/63
(Continued)

FOREIGN PATENT DOCUMENTS

DE          10361132 A1    1/2005
DE   102015106227 B3    5/2016
(Continued)

OTHER PUBLICATIONS

Schou C et al., "Human-robot Interface for Instructing Industrial Tasks Using Kinesthetic Teaching", IEEE ISR 2013, (Oct. 24, 2013) [XP032546561].
(Continued)

*Primary Examiner* — Adam R Mott
*Assistant Examiner* — Sagar Kc
(74) *Attorney, Agent, or Firm* — Burns & Levinson LLP

(57) ABSTRACT

Method and robot arm, where the motor torques of the joint motors of a robot arm are controlled based on a static motor torque indicating the motor torque needed to maintain the robot arm in a static posture, where the static motor torque is adjusted in response to a change in posture of the robot arm caused by an external force different from gravity applied to the robot arm. Further the motor torque of the joint motors is controlled based on an additional motor torque obtained based on a force-torque provided to the robot tool flange, where the force-torque is obtained by a force-torque sensor integrated in the tool flange of the robot arm.

20 Claims, 3 Drawing Sheets

(51) Int. Cl.
 B25J 13/08 (2006.01)
 B25J 17/02 (2006.01)
(52) U.S. Cl.
 CPC ........... B25J 13/085 (2013.01); B25J 13/088 (2013.01); B25J 17/02 (2013.01)
(58) Field of Classification Search
 CPC . B25J 17/02; B25J 9/0081; B25J 9/16; G05B 2219/36418; G05B 2219/36429; G05B 2219/39194; G05B 2219/39529; G05B 2219/40586; G05B 19/423
 See application file for complete search history.

(56) References Cited

U.S. PATENT DOCUMENTS

| | | | |
|---|---|---|---|
| 6,678,582 B2 | 1/2004 | Waled | |
| 7,035,716 B2 | 4/2006 | Harris et al. | |
| 8,428,816 B2* | 4/2013 | Buur | B60W 50/04 701/36 |
| 8,583,285 B2 | 11/2013 | Aurnhammer et al. | |
| 8,614,559 B2 | 12/2013 | Kassow et al. | |
| 9,248,573 B2 | 2/2016 | Søe-Knudsen et al. | |
| 9,250,624 B2* | 2/2016 | Zimmermann | G05B 19/423 |
| 9,696,221 B2 | 7/2017 | Lauzier et al. | |
| 9,827,674 B2 | 11/2017 | Tronnier et al. | |
| 9,833,897 B2 | 12/2017 | Søe-Knudsen et al. | |
| 10,399,232 B2 | 9/2019 | Oestergaard et al. | |
| 10,576,629 B2 | 3/2020 | Rohmer et al. | |
| D895,704 S | 9/2020 | Johansen | |
| D895,705 S | 9/2020 | Johansen | |
| D895,706 S | 9/2020 | Johansen | |
| D898,090 S | 10/2020 | Johansen | |
| 10,850,393 B2 | 12/2020 | Oestergaard et al. | |
| D915,487 S | 4/2021 | Sell | |
| D924,228 S | 7/2021 | Mirth | |
| D932,485 S | 10/2021 | Mirth | |
| D932,486 S | 10/2021 | Mirth | |
| D932,487 S | 10/2021 | Mirth | |
| 2007/0142823 A1* | 6/2007 | Prisco | B25J 9/1638 606/1 |
| 2010/0145520 A1* | 6/2010 | Gerio | B25J 13/06 700/264 |
| 2010/0312392 A1* | 12/2010 | Zimmermann | G05B 19/423 700/258 |
| 2012/0130541 A1 | 5/2012 | Szalek | |
| 2013/0013108 A1* | 1/2013 | Jacobsen | B25J 3/04 700/250 |
| 2013/0079928 A1 | 3/2013 | Søe-Knudsen et al. | |
| 2013/0255426 A1* | 10/2013 | Kassow | B25J 9/1671 901/23 |
| 2015/0204742 A1 | 7/2015 | Draisey | |
| 2016/0136805 A1 | 5/2016 | Søe-Knudsen et al. | |
| 2017/0007336 A1* | 1/2017 | Tsuboi | B25J 9/1674 |
| 2017/0057095 A1 | 3/2017 | Oestergaard et al. | |
| 2018/0029221 A1* | 2/2018 | Tanaka | B25J 9/0081 |
| 2018/0079090 A1* | 3/2018 | Koenig | G16H 40/63 |
| 2018/0080841 A1* | 3/2018 | Cordoba | A61B 34/37 |
| 2018/0178380 A1 | 6/2018 | Oestergaard et al. | |
| 2018/0215050 A1* | 8/2018 | Kassow | B25J 17/025 |
| 2019/0086907 A1 | 3/2019 | Oestergaard et al. | |
| 2020/0171658 A1 | 6/2020 | Kielsholm Thomsen | |
| 2020/0340569 A1 | 10/2020 | Johansen | |
| 2020/0391393 A1 | 12/2020 | Johansen | |
| 2021/0039254 A1 | 2/2021 | Oestergaard et al. | |
| 2021/0086374 A1 | 3/2021 | Brandt et al. | |
| 2021/0237284 A1 | 8/2021 | Vraa et al. | |
| 2021/0260757 A1 | 8/2021 | Nielsen et al. | |
| 2021/0260759 A1 | 8/2021 | Knudsen et al. | |

FOREIGN PATENT DOCUMENTS

| | | |
|---|---|---|
| EP | 0850730 A1 * | 7/1998 |
| EP | 1632318 A2 | 3/2006 |
| EP | 1764192 A1 | 3/2007 |
| WO | 2014110682 | 7/2014 |

OTHER PUBLICATIONS

International Search Report for PCT/EP2019/065857, 4 pages (dated Oct. 8, 2019).
Written Opinion for PCT/EP2019/065857, 11 pages (dated Oct. 8, 2019).
International Search Report for PCT/EP2018/084854, 5 pages (dated Jun. 20, 2019).
Written Opinion for PCT/EP2018/084854, 9 pages (dated Jun. 20, 2019).
Jeremy A. Marvel et al.: "Implementing speed and separation monitoring in collaborative robot workcells", Robotics and Computer Integrated Manufacturing, Elsevier Science Publishers BV., Barking, GB, vol. 44, Aug. 27, 2016, pp. 144-155, ISSN: 0736-5845, DOI: 10.1016/J.RCIM.2016.08.001, XP029830786.
Communication pursuant to Article 94(3) EPC in Application No. 19730181.5 dated Aug. 3, 2023 (10 pages).

* cited by examiner

DUAL MODE FREE-DRIVE OF ROBOT ARM

This application is a national stage entry of PCT Application No. PCT/EP2019/065857, which was filed on Jun. 17, 2019. PCT Application No. PCT/EP2019/065857 claims priority to European Patent Application No. EP18178059.4, which was filed on Jun. 15, 2018. This application claims priority to PCT Application No. PCT/EP2019/065857 and to European Patent Application No. EP18178059.4. The contents of PCT Application No. PCT/EP2019/065857 and of European Patent Application No. EP18178059.4 are incorporated herein by reference.

FIELD OF THE INVENTION

The present invention relates to a robot arm comprising a plurality of robot joints connecting a robot base and a robot tool flange, where the robot joints of the robot arm can be manually manipulated by a user in a so call free-drive mode.

BACKGROUND OF THE INVENTION

Robot arms comprising a plurality of robot joints and links where motors can rotate the joints in relation to each other are known in the field of robotics. Typically, the robot arm comprises a robot base which serves as a mounting base for the robot arm and a robot tool flange where to various tools can be attached. A robot controller is configured to control the robot joints in order to move the robot tool flange in relation to the base. For instance, in order to instruct the robot arm to carry out a number of working instructions.

Typically, the robot controller is configured to control the robot joints based on a dynamic model of the robot arm, where the dynamic model defines a relationship between the forces acting on the robot arm and the resulting accelerations of the robot arm. Often, the dynamic model comprises a kinematic model of the robot arm, knowledge about inertia of the robot arm and other parameters influencing the movements of the robot arm. The kinematic model defines a relationship between the different parts of the robot arm, and may comprise information of the robot arm such as, length, size of the joints and links and can for instance be described by Denavit-Hartenberg parameters or like. The dynamic model makes it possible for the controller to determine which torques the joint motors shall provide in order to move the robot joints for instance at specified velocity, acceleration or in order to hold the robot arm in a static posture.

On many robot arms it is possible to attach various end effectors to the robot tool flange, such as grippers, vacuum grippers, magnetic grippers, screwing machines, welding equipment, dispensing systems, visual systems etc.

Many robots can be set into a so call free-drive or Zero G mode of operation, where a user manually can change the posture of the robot by pushing or pulling the robot arm and where the robot controller is configured to hold the robot arm in a posture when a user is not pushing or pulling the robot arm.

In the free-drive mode of operation, the robot controller is configured to control the motor torque provided by the motor of the robot joints based on joint encoders and a dynamic model of the robot. Typically, the joint encoders provide a signal indicating the joint angle of each of the joints and the controller can based on the joint angles and a dynamic model of the robot calculate the force needed to maintain the robot arm in a posture. When a user pushes or pulls the robot arm a change in joint angle can be registered and the robot controller is configured to allow movement of the robot. In some embodiment the controller can be configured to apply a motor torque to the joint motors when a change in joint angle is registered for instance in order to assist movement of the robot arm, apply some resistance that the user need to overcome in order to change the posture of the robot arm. Some robot arms comprise torque sensors configured to indicate the torque applied to each of the robot joints and the robot controller can be configured to control the motor torques applied to the robot joints based on the torques applied to the robot joint.

The known free-drive modes require manipulation of the individual robot joints in order for the robot arm to change posture which in some situations may be difficult, for instance at work stations where a part of the robot arm put behind a shield preventing a user from rotating some of the robot joints.

U.S. Pat. No. 6,212,433B1 discloses a direct teaching apparatus which allows an operator to perform the direct teaching of a robot in safety. The apparatus includes a force detector and a teaching tool. The tool includes a working tool or handle fixed to the first detector and held by the operator to lead the robot. It also includes a device for computing the position or speed directive based on the force detector data and a motion model. It further includes a device for computing the generation torque of a motor for driving a robot depending on the position or speed directive and a controller to control the generated torque. The user needs to configure an provide the teaching apparatus to the robot system which complicates the usage of the teaching apparatus and further the user can only move robot arm from the teaching apparatus.

US 2012/130541 discloses a method and apparatus for the direct and safe teaching of a robot. The apparatus consists of a plurality of tactile sensors and electronic circuitry encapsulated in a compact enclosure, and a handle protruding from the enclosure. The handle provides an easy means for an operator to apply an external force and to act on the sensors that generate electronic signals to the robot controller. The user needs to configure an provide the handle apparatus to the robot system which complicates the usage of the handle apparatus as the axis of the handle apparatus need to be linked to specified joints and further the user can only move the robot arm using the handle apparatus.

SUMMARY OF THE INVENTION

The object of the present invention is to address the above described limitations with the prior art or other problems of the prior art. This is achieved by the method and robot arm according to the independent claims, where the motor torques of the joint motors of a robot arm are controlled based on a static motor torque indicating the motor torque needed to maintain the robot arm in a static posture, where the static motor torque is adjusted in response to a change in posture of the robot arm caused by an external force different from gravity. Further the motor torque of the joint motors is controlled based on an additional motor torque obtained based on a force-torque provided to the robot tool flange, where the force-torque is obtained by a force-torque sensor integrated in the tool flange of the robot arm. This makes it possible for the user to move the tool flange without manipulating each of the robot joints, for instance by pushing, pulling or rotating the robot tool flange. Additionally, in the free-drive mode of operation according to the present invention the user can also choose to manipulate the individual robot joints by providing an external force to any part of the robot arm in order to change the posture of the robot arm. Utilizing a force-torque sensor integrated into the tool flange of the robot arm ensures that the force-torque sensor can be configured without involving the user. Consequently, the user is provided with a larger flexibility and options when changing the posture of the robot arm in free-drive mode of operation. The dependent claims describe possible embodiments of the robot and methods according to the present invention. The advantages and benefits of the present invention are described in further detail the detailed description of the invention.

DETAILED DESCRIPTION OF THE INVENTION

The present invention is described in view of exemplary embodiments only intended to illustrate the principles of the present invention. The skilled person will be able to provide several embodiments within the scope of the claims. Throughout the description, the reference numbers of similar elements providing similar effects have the same last two digits. Further it is to be understood that in the case that an embodiment comprises a plurality of the same features then only some of the features may be labeled by a reference number.

Figure 1:
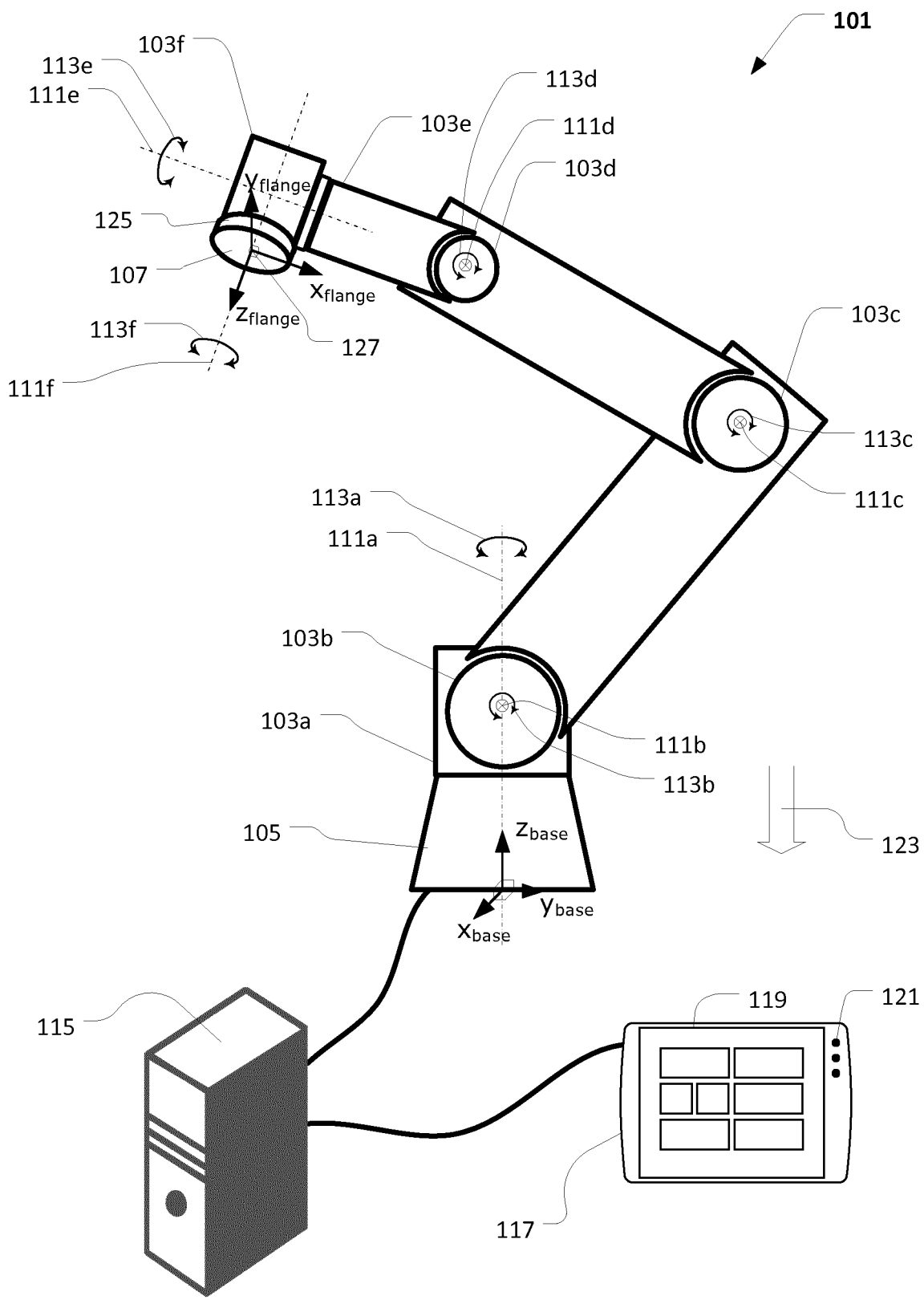
FIG. 1 illustrates a robot arm according to the present invention.

FIG. 1 illustrates a robot arm 101 comprising a plurality of robot joints 103a, 103b, 103c, 103d, 103e, 103f connecting a robot base 105 and a robot tool flange 107. A base joint 103a is configured to rotate the robot arm around a base axis 111a (illustrated by a dashed dotted line) as illustrated by rotation arrow 113a; a shoulder joint 103b is configured to rotate the robot arm around a shoulder axis 111b (illustrated as a cross indicating the axis) as illustrated by rotation arrow 113b; an elbow joint 103c is configured to rotate the robot arm around an elbow axis 111c (illustrated as a cross indicating the axis) as illustrated by rotation arrow 113c, a first wrist joint 103d is configured to rotate the robot arm around a first wrist axis 111d (illustrated as a cross indicating the axis) as illustrated by rotation arrow 113d and a second wrist joint 103e is configured to rotate the robot arm around a second wrist axis tile (illustrated by a dashed dotted line) as illustrated by rotation arrow 113e. Robot joint 103f is a tool joint comprising the robot tool flange 107, which is rotatable around a tool axis 111f (illustrated by a dashed dotted line) as illustrated by rotation arrow 113f. The illustrated robot arm is thus a six-axis robot arm with six degrees of freedom, however it is noticed that the present invention can be provided in robot arms comprising less or more robot joints.

Each of the joints comprises a robot joint body and an output flange rotatable in relation to the robot joint body and the output flange is connected to a neighbor robot joint either directly or via an arm section as known in the art. The robot joint comprises a joint motor configured to rotate the output flange in relation to the robot joint body, for instance via a gearing or directly connected to the motor shaft. The robot joint body can for instance be formed as a joint housing and the joint motor can be arranged inside the joint housing and the output flange can extend out of the joint housing.

Additionally, the robot joint comprises at least one joint sensor providing a sensor signal indicative of at least one of the following parameters: an angular position of the output flange, an angular position of the motor shaft of the joint motor, a motor current of the joint motor or an external force trying to rotate the output flange or motor shaft. For instance, the angular position of the output flange can be indicated by an output encoder such as optical encoders, magnetic encoders which can indicate the angular position of the output flange in relation to the robot joint. Similar the angular position of the joint motor shaft can be provided by an input encoder such as optical encoders, magnetic encoders which can indicate the angular position of the motor shaft in relation to the robot joint. It is noted that both output encoders indicating the angular position of the output flange and input encoders indicating the angular position of the motor shaft can be provided, which in embodiments where a gearing have been provided makes it possible to determine a relationship between the input and output side of the gearing. The joint sensor can also be provided as a current sensor indicating the current through the joint motor and thus be used to obtain the torque provided by the motor. For instance, in connection with a multiphase motor, a plurality of current sensors can be provided in order to obtain the current through each of the phases of the multiphase motor.

The robot tool flange 107 comprises a force-torque sensor 125 integrated into the robot tool flange 107. The force-torque sensor 125 provides a tool flange force signal indicating a force-torque provided at the tool flange. In the illustrated embodiment the force-torque sensor is integrated into the robot tool flange and is configured to indicate the forces and torques applied to the robot tool flange in relation to a reference point 127 of the robot tool flange. In FIG. 1 the reference point 127 is coincident with the origin of a tool flange coordinate system defining three coordinate axis $x_{flange}$, $y_{flange}$, $z_{flange}$. In the illustrated embodiment the origin of the robot tool flange coordinate system has been arrange on the tool flange axis 111f with one axis ($z_{flange}$) parallel with the tool flange axis and at the outer surface of the robot tool. However, the force-torque sensor can indicate the force-torque applied to the robot tool flange in relation to any point which can be linked to the robot tool flange coordinate system. In one embodiment the force-torque sensor is a six-axis force-torque sensor configured to indicate the forces along and the torques around three perpendicular axis. The force torque sensor can for instance be provided as any force torque sensor capable of indicating the forces and torques in relation to a reference point for instance any of the force torque sensors disclosed by WO2014/110682A1, U.S. Pat. No. 4,763,531, US2015204742.

The robot arm comprises at least one robot controller 115 configured to control the robot joints by controlling the motor torque provided to the joint motors based on a dynamic model of the robot and the joint sensor signal. The robot controller 115 can be provided as a computer comprising in interface device 117 enabling a user to control and program the robot arm. The controller can be provided as an external device as illustrated in FIG. 1 or as a device integrated into the robot arm. The interface device can for instance be provided as a teach pendent as known from the field of industrial robots which can communicate with the controller via wired or wireless communication protocols. The interface device can for instanced comprise a display 119 and a number of input devices 121 such as buttons, sliders, touchpads, joysticks, track balls, gesture recognition devices, keyboards etc. The display may be provided as a touch screen acting both as display and input device.

Figure 2:
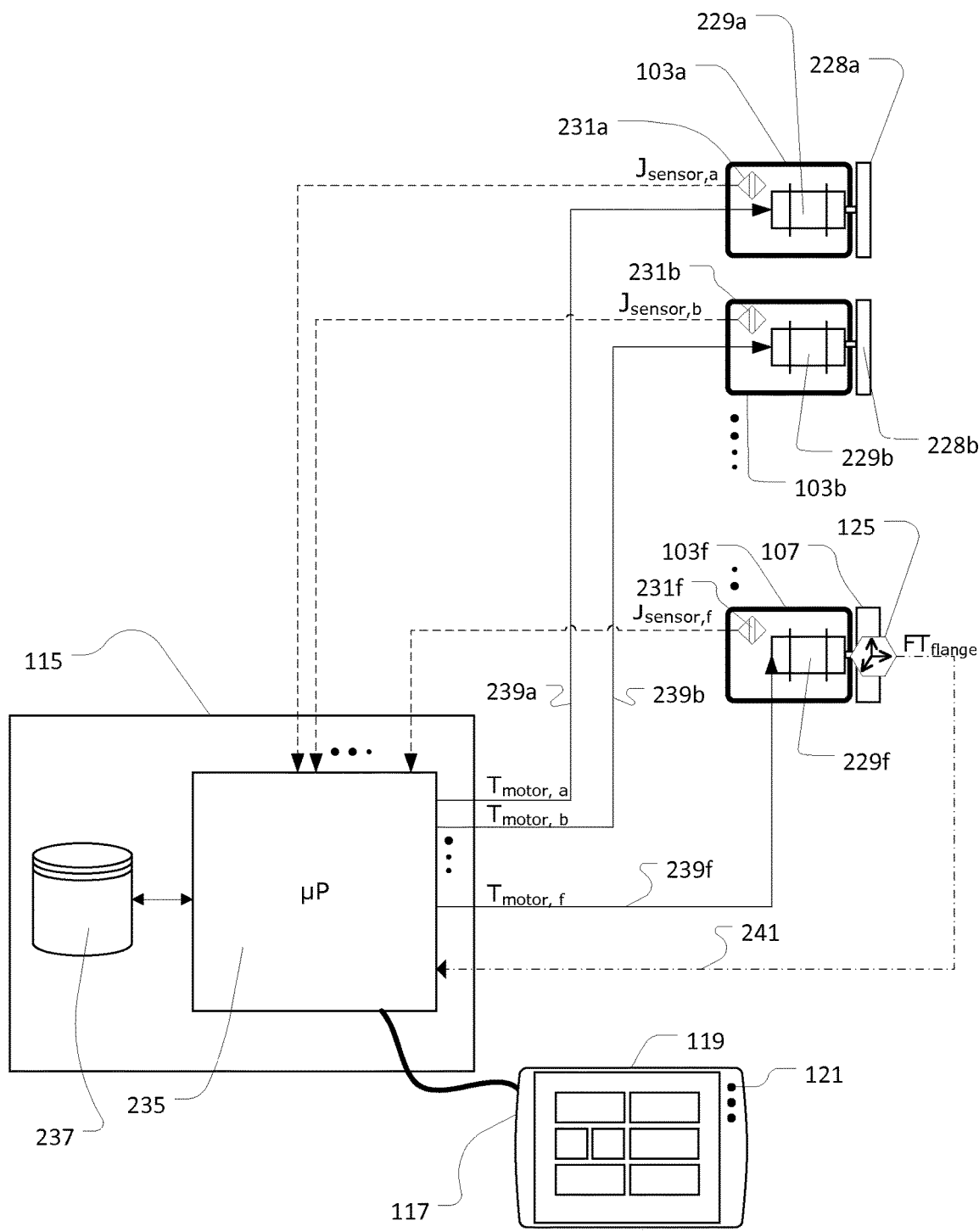
FIG. 2 illustrates a simplified structural diagram of the robot arm.

FIG. 2 illustrates a simplified structural diagram of the robot arm illustrated in FIG. 1. The robot joints 103a, 103b and 103f have been illustrated in structural form and the robot joints 103c, 103d, 103e have been omitted for the sake of simplicity of the drawing. Further the robot joints are illustrated as separate elements however it is to be understood that they are interconnected as illustrated in FIG. 1. The robot joints comprise an output flange 228a, 228b, 107 rotatable in relation to the robot joint body and joint motors 229a, 229b, 229f are configured to rotate the output flange. In this embodiment the output flange of the tool joint 103f constitutes the tool flange 107. At least one joint sensor 231a, 231b, 231f providing a sensor signal 233a, 233b, 233f indicative of at least one joint sensor parameter $J_{sensor,a}$, $J_{sensor,b}$, $J_{sensor,f}$ of the respective joint. The joint sensor parameter is at least indicative of one of the parameters: an angular position of the output flange, an angular position of a shaft of the joint motor, a motor current of the joint motor. For instance, the angular position of the output flange can be indicated by an output encoder such as optical encoders, magnetic encoders which can indicate the angular position of the output flange in relation to the robot joint. Similar the angular position of the joint motor shaft can be provided by an input encoder such as optical encoders, magnetic encoders which can indicate the angular position of the motor shaft in relation to the robot joint.

The robot controller 115 comprises a processer 235 and memory 237 and is configured to control the joint motors of the robot joints by providing motor control signals 239a, 239b, 239f to the joint motors. The motor control signals 239a, 239b, 293f are indicative of the motor torque $T_{motor,a}$, $T_{motor, b}$, and $T_{motor,f}$ that each joint motor shall provide to the output flanges and the robot controller is configured to determine the motor torque based on a dynamic model of the robot arm as known in the prior art. The dynamic model makes it possible for the controller to calculate which torque the joint motors shall provide to each of the joint motors to make the robot arm perform a desired movement. The dynamic model of the robot arm can be stored in the memory 237 and be adjusted based on the joint sensor parameter $J_{sensor,a}$, $J_{sensor,b}$, $J_{sensor,f}$. For instance, the joint motors can be provided as multiphase electromotors and the robot controller can be configured to adjust the motor torque provided by the joint motors by regulating the current through the phases of the multiphase motors as known in the art of motor regulation.

Robot joint 103e comprising the tool flange 107 comprises force-torque sensor 125 providing a tool flange force signal 241 indicating a force-torque $FT_{flange}$ provided to the tool flange. For instance the force-torque $FT_{flange}$ can be indicated as a force vector $\overrightarrow{F_{sensor}^{flange}}$ and a torque vector $\overrightarrow{T_{sensor}^{flange}}$ in the robot tool flange coordinate system:

$$\overrightarrow{F_{sensor}^{flange}} = \begin{pmatrix} F_{x,sensor}^{flange} \\ F_{y,sensor}^{flange} \\ F_{z,sensor}^{flange} \end{pmatrix} \qquad \text{eq. 1}$$

where $F_{x,sensor}^{flange}$ is the indicated force along the $x_{flange}$ axis, $F_{y,sensor}^{flange}$ is the indicated force along the $y_{flange}$ axis and $F_{z,sensor}^{flange}$ is the indicated force along the $z_{flange}$ axis. And a torque vector in the robot tool flange coordinate system:

$$\overrightarrow{T_{sensor}^{flange}} = \begin{pmatrix} T_{x,sensor}^{flange} \\ T_{y,sensor}^{flange} \\ T_{z,sensor}^{flange} \end{pmatrix} \qquad \text{eq. 2}$$

where $T_{x,sensor}^{flange}$ or is the indicated torque around the $x_{flange}$ axis, $T_{y,sensor}^{flange}$ is the indicated torque around the $y_{flange}$ axis and $T_{z,sensor}^{flange}$ is the indicated torque around the $z_{flange}$ axis.

The robot controller is switchable into a free-drive mode of operation, where the robot controller in the free-drive mode of operation is configured to:

maintain the robot arm in a static posture when only gravity (gravity force illustrated as 123) is acting on the robot arm;

allow change in posture of the robot arm when an external force different from gravity is applied to the robot arm.

When only gravity is acting on the robot arm, the robot controller can be configured to maintain the robot arm in a static posture by driving the joint motors at a state where they provide sufficient motor torque to overcome gravity without moving parts of the robot arm. The robot controller can be configured to determine the sufficient motor torque based on the dynamic model of the robot arm at the static posture. The static posture can for instance be indicated by joint sensors provided as output encoders indicating the angular position of the output flange and/or input encoders indicating the angular position of the motor shaft. The static posture can also be stored as a posture in the control software for instance by defining the joint angles of the robot joints at the static posture.

When an external force different from gravity is applied to the robot arm, the robot controller can allow change in posture by driving the joint motors with a motor torque that allows a user to rotate the output flanges of the robot joint. For instance, the robot controller can be configured to drive the motor with a motor torque sufficient for maintaining the robot arm in the static posture, and an additional force and/or torque applied to the robot arm will thus overcome the sufficient motor torque, whereby the output flange of the joints will rotate due to the additional force and/or torque. During change of the robot arm posture the robot controller can be configured to adjust the sufficient motor torque based on the changes in posture resulting in the effect that the robot arm will be maintained in the new static posture when the additional external force is reduced.

In the free-drive mode of operation, the robot controller is further configured to control the motor torque of the joint motors based on the tool flange force signal 241 from the force-torque sensor 125. This makes it possible for the user to move the tool flange without manipulating each of the robot joints, for instance by pushing, pulling or rotating the robot tool flange. Additionally, in the free-drive mode of operation according to the present invention the user can also choose to manipulate the individual robot joints to change the posture of the robot arm. Consequently, the user is provided with a larger flexibility and options when changing the posture of the robot arm in free-drive mode of operation.

Figure 3:
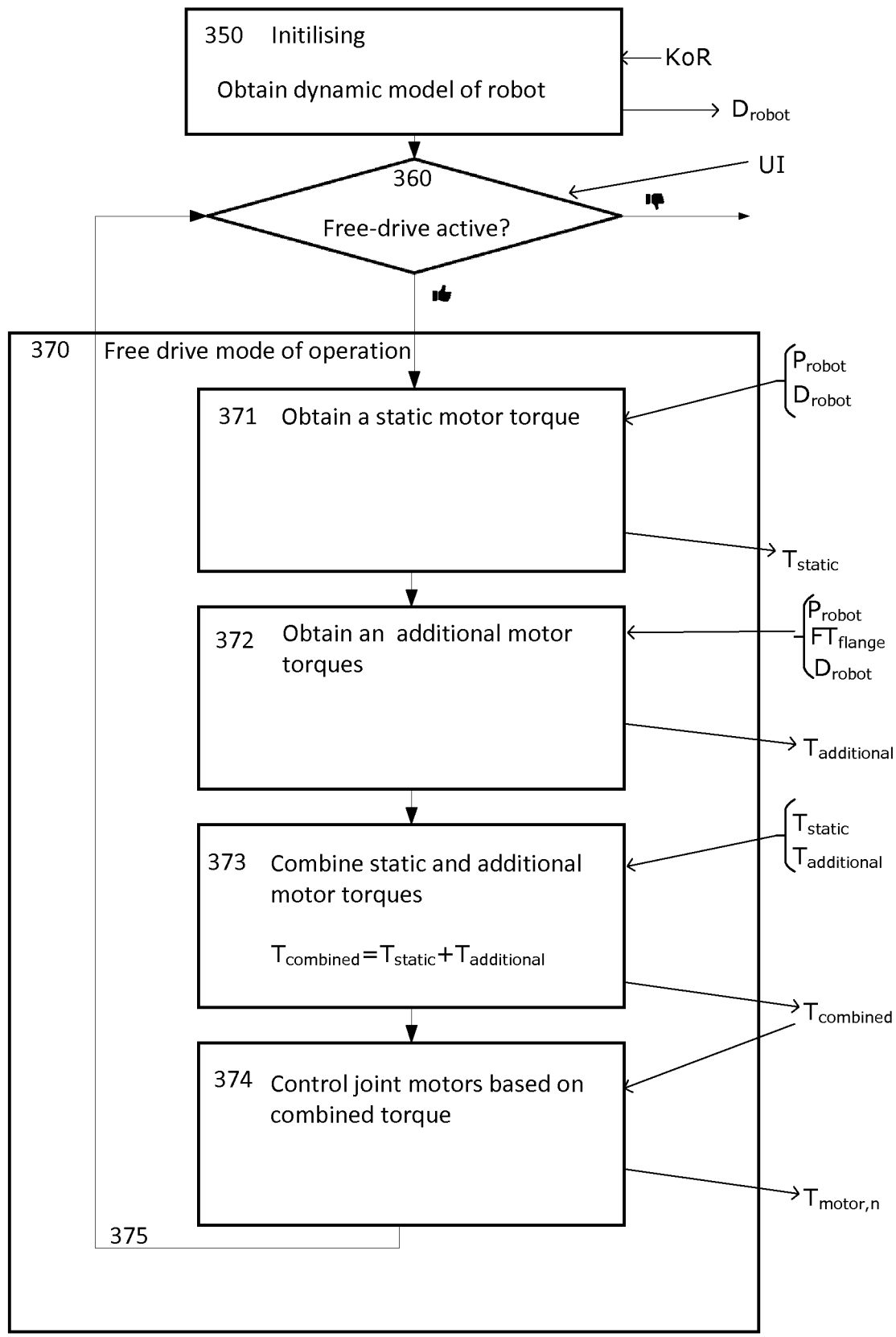
FIG. 3 illustrates a flow diagram of the method of changing the posture of a robot arm.

FIG. 3 illustrates a flow diagram of the method of changing the posture of a robot arm according to the present invention. The method comprises a step of initializing 350 comprising obtaining the dynamic model $D_{robot}$ of the robot arm, which can be based on prior knowledge of the robot arm, KoR, such as the dimensions and weight of robot joints and robot links; joint motor properties; information relating to an eventual payload attached to the robot arm, orientation of the robot arm in relation to gravity etc. The dynamic model of the robot arm can be defined and pre-stored in the memory of the controller and the user can in some embodiments be allowed to modify the dynamic model op the robot arm, for instance by providing payload information of a payload attached to the robot arm or defining the orientation of the robot arm in relation to gravity.

Step 360 is a step of activating free-drive mode of operation of the robot arm. Typically, the free-drive mode of operation is activated during programming of the robot arm for instance in order to allow a user to manually change the posture of the robot arm, e.g. in order to define waypoints/postures of the robot arm during a robot program. The free-drive mode of operation can be activated based on a user input instructing the robot controller to activate the free-drive mode of operation. Thus step 360 can receive a user input, UI activating the free-drive mode of operation and enters the free-drive mode of operation 370, as indicated by a thumb up icon, if such user input is received. If no user instructions to enter the free-drive mode of operation is received, the robot controller will, as indicated by a thumb down icon, not enter to free-drive mode of operation. The user input can be received through any input device capable of receiving user inputs for instance buttons, joysticks, touch screens, gesture recognition devices, sliders etc. In one embodiment the free-drive mode of operation is activated based on the force-torque signal resulting in the fact that the user can activate the free-drive mode of operation directly at the robot arm simply by applying a force and/or torque to the robot tool flange. Once the robot controller has entered the free-drive mode of operation the user input can indicate that the robot controller shall bring the robot arm out of free drive mode of operation.

Step 370 is as step of running the robot arm in free-drive mode of operation and comprises a step 371 of obtaining a static motor torque $T_{static}$ keeping the robot arm in a static posture, a step 372 of obtaining an additional motor torque $T_{additional}$, a step 373 of combining the static motor torque and additional motor torque into a combined motor torque $T_{combined}$, and a step 374 of controlling the joint motor based on the combined motor torque.

The static motor torque $T_{static}$ obtained in step 371 can be obtained based on the actual posture of the robot arm $P_{robot}$ and the dynamic model of the robot arm $D_{robot}$, where the dynamic model of the robot arm defines a relationship between the posture of the robot arm and the motor torque needed to maintain the robot arm in a static posture under influence of gravity. The static motor torque indicates the motor torque that the joint motors need to provide in order to keep the robot arm in a static posture under influence of gravity. The actual posture of the robot arm $P_{robot}$ can be obtained based on joint output encoders indicating the angular position of each of the output flanges of the robot joints and the static motor torque $T_{static}$ can be provided as a vector or array where the static motor torque $T_{static,n}$ for each of the joint motors are provided, where n indicate the number of the robot joint with the robot motor that shall provide the obtained $n^{th}$ static motor torque. Driving the motor joint with currents generating the static motor torque results in the effect that the robot arm is kept in a static posture when it is only influenced by gravity. A user may move parts of the robot arm by manipulating the robot joints for instance by pushing, pulling and/or rotating parts of the robot arm whereby an external force/torque is applied to the robot arm. If such eternal force/torque exceeds the static motor torque of the robot joints, the joint motors will not be able to prevent modification of the robot arm posture and the user can thereby change to posture of the robot arm.

The additional motor torque $T_{additional}$ obtained in step 372 is obtained based on the force-torque $FT_{flange}$ provided to the tool flange, the dynamic model of the robot arm $D_{robot}$ and the actual posture of the robot arm $P_{robot}$. The force-torque $FT_{flange}$ is provided by the force-torque sensor at the robot tool flange. The additional motor torque indicates the motor torque that the joint motors need to provide to move and/or rotate the robot tool flange in response to the force/torques provided to the robot tool flange and obtained by the force-torque sensor. For instance, a force provided in a given direction to the robot tool flange may result in a movement of the robot tool flange in that direction and the size of the force may indicate the desired acceleration of the movement. Similar a torque provided in a given direction to the robot tool flange may result in a rotation of the robot tool flange in the direction of the torque and the size of the torque may indicate the desired angular acceleration of the rotation. The additional motor torque $T_{additional}$ can be provided as a vector where the additional motor torque $T_{additional,n}$ for each the joint motors is provided, where n indicate the joint number of the robot motor that shall provide the obtained static motor torque. Driving the motor joint with currents generating the additional motor torque results in the effect that the robot tool flange can be moved and/or rotated in the direction of the force and/or torque provided to the robot tool flange. In the illustrated embodiment the additional motor torque indicates the motor torques that in addition to the static torques needs to be provided in order to move the robot arm.

The combined motor torque $T_{combined}$ obtained in step 372 is obtained by combining the static motor torque $T_{static}$ and the additional motor torque $T_{addition}$ into a combined motor torque $T_{combined}$. In this embodiment this is achieved by adding the static motor torque and the additional motor torque:

$$T_{combined} = T_{static} + T_{additional} \qquad \text{eq. 3}$$

Consequently, the combined motor torque $T_{combined}$ indicate the total motor torques that need to be provide by the joint motors to both overcome gravity and move/rotate the robot tool flange based on the force-torques provided to the robot tool flange.

The step of controlling the joint motor based on the combined motor torque comprises providing a number of control signals to each of the joint motors indicating the motor torque of each joint motor $T_{motor,n}$, where n indicate the joint number of the robot motor that shall provide the motor torque. The motor torque of the joint motor may be regulated by varying the current through the joint motor as known in the art of motor regulation.

Steps 360, 371, 372, 373, and 374 are continuously repeated 375 until an user input received in step 360 indicates that the robot controller shall exit free-drive mode of operation.

In an embodiment the method comprises a step of changing the posture of the robot arm by providing an external force and/or torque to at least one of the robot joints and in response to the change in posture obtaining the static motor torque based on the changed posture of the robot arm and the dynamic model of the robot arm. This makes it possible for a user to manually mover parts of the robot arm and automatically keep the robot arm in the new posture after the manipulation.

In an embodiment the method comprises a step of changing the posture of the robot arm by providing an external force and/or torque to the robot tool flange and in response to the change in posture obtaining the static motor torque based on the changed posture of the robot arm and the dynamic model of the robot arm. This makes it possible for a user to move the robot tool flange of the robot arm by gripping the robot tool flange and pulling, pushing and/or rotating the robot tool flange in the desired direction and thereafter automatically keep the robot arm in the new posture after the manipulation.

The robot and method according to the present invention extends the user ability when changing posture of the robot arm in free-drive mode of operation. The additional motor torque $T_{additional}$ is zero in situations where the user does not provide a force-torque to the robot tool flange. Consequently, the robot arm is automatically kept in a static position where the motor torque provided to the joint motors are defined by the static motor torque. The user can in this situation still move the robot arm by manipulating the robot joints, for instance in order to arranging the robot arm in various postures. In situations where the user provides a force-torque to the robot tool flange for instance by pushing, pulling or rotating the robot tool flange the force-torque sensor provides a force-torque signal and the additional motor torque $T_{additional}$ is larger than zero and the motor torque is provided as the static motor torque plus and additional motor torque obtained based on the force-torque signal. Consequently, in response to a force-torque provided to the robot tool flange the robot tool flange can be moved or rotated in the direction of the supplied force-torques. The user can in free-drive both adjust the pose of the robot arm by manipulating the robot joints and by providing forces-torques to the robot tool flange, which provides the user with a greater flexibility. In some situation the user may desire to move the robot tool flange in a given direction or to rotate it around a given axis of rotation, which intuitively can be performed by pushing, pulling and/or rotating the robot tool flange, which is less difficult than manipulating robot joint, as in some postures of the robot arm it may be difficult to provide sufficient force to the robot joint in order to rotate the output flange of the robot joint. In other situations, the user may desire to adjust the posture of the robot arm independently of the movement of the robot tool flange, for instance in order to adjust the posture of a robot joint without moving the robot tool flange.

In an embodiment the robot controller is configured to control the robot joints by controlling the motor torque provided by the joint motors based on a maximum allowed motor torque. This makes it possible to control the speed at which the robot tool flange is moved in response to a force-torque provided to the robot tool flange. Consequently, the robot tool flange can be prevented from moving at speeds potentially causing damages in case of a collision between the robot arm and an object or human near the robot arm. In one embodiment this can be achieved by providing a maximum allowed motor torque in relation the additional torques. This prevents a user from moving the robot arm at high speeds even when large force-torques are provided to the robot tool flange. It is noticed that the limitations of the motor torque can be provided based on a maximum force-torque limit related to the robot tool flange.

In another embodiment the robot controller is configured to control the robot joints by controlling the motor torque provided by the joint motors based on a maximum allowed motor torque change rate. This makes it possible to control the changes of speed of the robot tool flange when the robot tool flange is moved in response to a force-torque provided to the robot tool flange. Consequently, the acceleration/deceleration of the robot tool flange can be controlled, and a user can be prevented from providing undesired accelerations of the robot tool flange. This ensures safety as the user better can control the change of speed of the robot tool flange and further ensure that the gearing or other components of the robot are not damaged due to large changes of speed of the movements.

In one embodiment the robot controller is configured to switch into the free-drive mode of operation based on the force-torque provided to the robot tool flange. Thus, the user can simply activate free-drive mode of operation by gripping the robot tool flange whereby the force-torque sensor indicates a change in force and torque.

In one embodiment the robot controller is configured only to allow entering free-drive mode when the robot arm is in programming mode and thereby prevent the robot controller from entering into free-drive mode during execution of a program.

In one embodiment the robot joints comprise an output encoder indicating the angular position of the output flange in relation to the robot joint. The robot controller can the based on a kinematic model of the robot determined the posture of the robot at any time based on the output encoders of the robot joint.

Alternatively, to control the motor torques of the joint motor based on the combined motor torque as described above the controller can be configured to control the motor torque of the joint motor based on the static torque when the indicate force-torque at the robot tool flange is zero or below a given threshold and to control the motor torque of the joint motor based on the total additional force when the indicate force-torque at the robot tool flange is more than zero or above a given threshold. The total additional torque indicates the total motor torques that need to be provided by the joint motors to both overcome gravity and move/rotate the robot tool flange.

The present invention can also be described by the following statements numbered in roman numbers:

I. A robot arm (101) comprising a plurality of robot joints (103a-103f) connecting a robot base (105) and a robot tool flange (107); each of said robot joints comprises
an output flange (228a, 228b,107) rotatable in relation to said robot joint
a joint motor (229a,229b,229f) configured to rotate said output flange,
at least one joint sensor (231a, 231c, 231f) providing a sensor signal (231a,231b,231f) indicative of at least one of an angular position of said output flange, an angular position of a shaft of said joint motor, a motor current of said joint motor;
said robot arm comprises at least one robot controller (115) configured to control said robot joints by controlling the motor torque provided by said joint motors based on said joint sensor signal, said robot controller is switchable into a free-drive mode of operation where said robot controller in said free-drive mode of operation is configured to:
maintain said robot arm in a static posture when only gravity is acting on said robot arm;
allow change in posture of said robot arm when an external force different from gravity is applied to said robot arm;

wherein that said robot tool flange comprises a force-torque sensor (125) arranged at said robot tool flange (107); said force-torque sensor providing a tool flange force signal (241) indicating a force-torque provided to said tool flange and said robot controller is in said free-drive mode of operation configured to control said motor torque based on said flange force signal.

II. The robot arm according to statement I wherein said robot controller is configured to obtain a static motor torque based on the actual posture of the robot arm and based on a dynamic model of said robot and said robot controller is configured to control said robot joints by controlling the motor torque provided by said joint motors based on said static torque.

III. The robot arm according to any one of statements I-II wherein said robot controller is configured to obtain an additional motor torque based on the actual posture of the robot arm, a dynamic model of said robot arm and said force-torque provided to said robot tool flange, where said robot controller is configured to control said robot joints by controlling the motor torque provided by said joint motors based on said additional torque.

IV. The robot arm according to statement II and III wherein said robot controller is configured to control said robot joints by controlling the motor torque provided by said joint motors based on a sum of said static motor torque and a said additional motor torque.

V. The robot arm according to any one of statements I-IV wherein said robot controller is configured to control said robot joints by controlling the motor torque provided by said joint motors based on a maximum allowed motor torque.

VI. The robot arm according to any one of statements I-V wherein said robot controller is configured to control said robot joints by controlling the motor torque provided by said joint motors based on a maximum allowed motor torque change rate.

VII. The robot arm according to any one of statements I-VI wherein said robot controller is configured to switch into said free-drive mode of operation based on said force-torque provided to said robot tool flange.

VIII. The robot arm according to any one of statements I-VII wherein said robot joints comprises an output encoder indicating the angular position of said output flange in relation to said robot joint.

IX. A method of changing the posture of a robot arm (101), said robot arm comprises a plurality of robot joints (103a-103f) connecting a robot base (105) and a robot tool flange (107); said robot joints comprises:
an output flange (228a,228b,107) rotatable in relation to said robot joint
a joint motor (229a,229b,229f) configured to rotate said output flange,
at least one joint sensor providing a sensor signal indicative of the angular position of said output flange,
said method comprises the steps of:
obtaining (371) a static motor torque based on the actual posture of said robot arm and a dynamic model of said robot arm, where said static motor torque indicates a motor torque that said joint motors need to provide in order to keep said robot arm in a static posture under influence of gravity;
controlling (374) the motor torque of said joint motors based on said static motor torque;
characterized in that said method comprises the steps of:
obtaining the force-torque provided to said robot tool flange based on a force-torque sensor arranged at said robot tool flange;
obtaining (373) an additional motor torque, based on said force-torque provided to said robot tool flange, said dynamic model and said actual posture of the robot arm;
wherein said step of controlling said motor torque of said joint motors is further based on said additional motor torque.

X. The method according to statement 9 wherein said method comprises a step of obtaining said actual posture of said robot arm based on said at least one joint sensor providing a sensor signal indicative of the angular position of said output flange.

XI. The method according to any one of statements IX-X wherein said method comprise a step of changing the posture of said robot arm by providing an external force and/or torque to at least one of said robot joints, and in response to said change in posture obtaining said static motor torque based on the changed posture of said robot arm and said dynamic model of said robot arm.

XII. The method according to any one of statements IX-XI wherein said method comprise a step of changing the posture of said robot arm by providing an external force and/or torque to said robot tool flange, and in response to said change in posture obtaining said static motor torque based on the changed posture of said robot arm and said dynamic model of said robot arm.

BRIEF DESCRIPTION OF FIGURE REFERENCES

101: robot arm
103a-103f: robot joint
105: robot base
107: robot tool flange
111a-111f: axis of rotation
113a-113f: rotation arrow
115: robot controller
117: interface device
119: display
121: input device
123: direction of gravity
125: force-torque sensor
127: reference point of the robot tool flange
228a-228b: output flange
229a-229f: joint motors
231a-231f: joint sensor
233a-233f: sensor signal
235: processer
237: memory
239a-239f: motor control signals
241: tool flange force signal
350: step of initializing
360: step of activating free-drive mode of operation
370: step of running the robot arm in free-drive mode of operation
371: step of obtaining a static motor torque
372: step of obtaining an additional motor torque
373: step of combining the static motor torque and additional motor torque
374: step of controlling the joint motor
375: Repeating
$D_{robot}$: dynamic model of the robot arm
$FT_{flange}$: force-torque provided to the tool flange $J_{sensor,a}$-$J_{sensor,f}$: joint sensor parameters
KoR: knowledge of the robot arm
$P_{robot}$: posture of the robot arm
$x_{base}$, $y_{base}$, $z_{fbase}$: axis of base coordinate system
$x_{flange}$, $y_{flange}$, $z_{flange}$: axis of tool flange coordinate system
$T_{additional}$: additional motor torque
$T_{combined}$: combined motor torque
$T_{motor,a}$-$T_{motor,f}$: motor torque
$T_{static}$: static motor torque

The invention claimed is:

1. A robot system comprising:
a robotic arm comprising joints connecting a base of a robot to a tool flange, where the tool flange is configured for attachment to an end effector, and where each of the joints comprises:
an output flange that is rotatable relative to a body of a corresponding joint;
a motor that is configured to rotate the output flange relative to the body; and
at least one sensor configured to provide a sensor signal indicative of at least one of an angular position of the output flange, an angular position of a shaft in the motor, or a current in the motor;
at least one controller configured to control the joints by controlling torque provided by each motor, the at least one controller being switchable into a free-drive mode of operation in which the at least one controller is configured to perform operations comprising:
maintaining the robotic arm in a posture when an only force acting on the robotic arm is gravity, the robotic arm being maintained in the posture by driving each motor to provide static torque to overcome gravity without moving one or more parts of the robotic arm, where the at least one controller is configured to obtain the static torque based on the posture of the robotic arm and a dynamic model of the robotic arm; and
allowing a change in the posture of the robotic arm when an external force different from gravity is applied to the robotic arm and, in response to the change in posture, adjusting the static torque based on the change in posture and the dynamic model; and
a force-torque sensor integrated into the tool flange, the force-torque sensor for providing a force signal indicative of the external force applied to the tool flange;
wherein, in the free-drive mode of operation and in a presence of the external force applied to the tool flange, the at least one controller is configured to control torque provided by each motor to a corresponding joint by controlling each motor to provide additional torque that is based on the posture of the robotic arm, the dynamic model of the robotic arm, and the force signal; and
wherein in the free-drive mode of operation and in a presence of the external force applied to a component of the robotic arm other than the tool flange, the at least one controller is configured to control torque provided by each motor to a corresponding joint by controlling each motor to provide torque that is based solely on the posture of the robotic arm and the dynamic model of the robotic arm.

2. The robot system of claim 1, wherein, in the free-drive mode of operation and in the presence of the external force, the at least one controller is configured to control the joints by controlling torque provided by each motor based on a sum of the static torque that enables the posture of the robotic arm and the additional torque.

3. The robot system of claim 1, wherein the at least one controller is configured to control the joints by controlling torque provided by each motor based on a maximum allowed motor torque.

4. The robot system of claim 1, wherein the at least one controller is configured to control the joints by controlling torque provided by each motor based on a maximum allowed rate of change for motor torque.

5. The robot system of claim 1, wherein the at least one controller is configured to switch into the free-drive mode of operation based on the force signal.

6. The robot system of claim 1, wherein a joint among the joints comprises an output encoder for providing an angular position of an output flange of the joint relative to the body of the joint.

7. The robot system of claim 6, wherein the at least one controller is configured to obtain the posture of the robotic arm based on the angular position of the output flange of the joint relative to the body of the joint.

8. The robot system of claim 7, wherein the at least one controller is configured to switch into the free-drive mode of operation based on the force signal.

9. The robot system of claim 1, wherein the at least one controller is configured to allow entry into the free-drive mode of operation only when the robotic arm is in a programming mode.

10. A method of changing a posture of a robotic arm of a robot, where the robotic arm comprises joints connecting a base of the robot to a tool flange, where the tool flange is configured for attachment to an end effector, and where each of the joints comprises:
an output flange that is rotatable relative to a body of a corresponding joint;
a motor configured to rotate the output flange relative to the body; and
at least one sensor configured to provide a sensor signal indicative of an angular position of the output flange;
wherein the method comprises:
obtaining a static torque for each motor based on the posture of the robotic arm and a dynamic model of the robotic arm, where the static torque comprises torque that each motor needs to provide in order to keep the robot arm in a static posture under influence of gravity;
controlling the torque of each motor based on the static motor torque; and
in response to a change in the posture of the robotic arm caused by an external force that is applied to the robotic arm and that is different from gravity:
adjusting the static torque based on the change in the posture of the robotic arm and a dynamic model of the robotic arm, where an adjusted static torque corresponds to a torque that each motor needs to provide in order to keep the robotic arm at the change in the posture under influence of gravity; and
controlling torque of each motor based on an adjusted static torque;
obtaining an amount of external force applied to the tool flange based on a force-torque sensor integrated into the tool flange; and
obtaining an additional torque based on the amount of external force applied to the tool flange, the dynamic model, and the posture of the robotic arm defined by the static torque;
wherein, in a free-drive mode of operation and in a presence of the external force applied to the tool flange, controlling the torque of each motor comprises controlling each motor to provide the additional torque that is based on the posture of the robotic arm, the dynamic model of the robotic arm, and a force signal from the force-torque sensor; and wherein, in the free-drive mode of operation and in a presence of the external force applied to a component of the robotic arm other than the tool flange, controlling the torque of each motor comprises controlling each motor to provide torque that is based solely on the posture of the robotic arm and the dynamic model of the robotic arm.

11. The method of claim 10, further comprising obtaining the posture of the robotic arm based on a sensor signal from a sensor representing an angular position of an output flange.

12. The method of claim 10, further comprising changing the posture of the robotic arm by providing an external force and/or a torque to at least one of the joints.

13. The method of claim 10, further comprising:
changing the posture of the robotic arm by providing an external force and/or a torque to the tool flange.

14. A robot system comprising:
a robotic arm comprising joints connecting a base of a robot to a tool flange, each of the joints comprising:
an output flange that is rotatable relative to a corresponding joint;
a motor configured to rotate the output flange; and
at least one sensor configured to provide a sensor signal corresponding to at least one of an angular position of the output flange, an angular position of a shaft of the motor, or a current in the motor;
at least one controller associated with the robot and configured to control the joints by controlling torque provided by each motor based on a corresponding sensor signal, the at least one controller being switchable into a free-drive mode of operation in which the at least one robot controller is configured to perform operations comprising:
maintaining the robotic arm in a posture when an only force acting on the robotic arm is gravity; and
allowing a change in the posture of the robotic arm when an external force that is different from gravity is applied to the robotic arm; and
a force-torque sensor integrated into the tool flange, the force-torque sensor for providing a force signal representing the external force applied to the tool flange; and wherein, in the free-drive mode of operation and in a presence of the external force applied to the tool flange, the at least one controller is configured to control torque provided by each motor to a corresponding joint by controlling each motor to provide additional torque that is based on the posture of the robotic arm, a dynamic model of the robotic arm, and the force signal; and wherein, in the free-drive mode of operation and in a presence of the external force applied to a component of the robotic arm other than the tool flange, the at least one controller is configured to control torque provided by each motor to a joint by controlling each motor to provide torque that is based solely on the posture of the robotic arm and the dynamic model of the robotic arm.

15. The robot system of claim 14, wherein, in the free-drive mode of operation, the at least one controller is configured to control the joints by controlling torque provided by each motor based on a sum of static torque that enables the posture of the robotic arm and the additional torque, the static torque comprising torque to keep the robotic arm in the static posture absent force other than gravity.

16. The robot system of claim 14, wherein the at least one controller is configured to control the joints by controlling torque provided by each motor based on a maximum allowed motor torque.

17. The robot of claim 14, wherein the at least one controller is configured to control the joints by controlling torque provided by each motor based on a maximum allowed rate of change for motor torque.

18. The robot system of claim 14, wherein a joint among the joints comprises an output encoder for providing an angular position of a corresponding output flange.

19. The robot system of claim 18, wherein the at least one controller is configured to obtain the posture of the robotic arm based on the angular position of the corresponding output flange.

20. The robot system of claim 14, wherein the at least one controller is configured to allow entry into the free-drive mode of operation only when the robotic arm is in a programming mode.

* * * * *